United States Patent [19]

Yamada et al.

[11] Patent Number: 4,656,505
[45] Date of Patent: Apr. 7, 1987

[54] METHOD FOR COLOR CORRECTION FOR MULTI-COLOR PRINTING PLATE PICTURES

[75] Inventors: Mitsuhiko Yamada; Hitomi Atoji, both of Kyoto, Japan; Katsuaki Kashiwabara, London, England

[73] Assignee: Dainippon Screen Mfg. Co., Ltd., Kyoto, Japan

[21] Appl. No.: 684,719

[22] Filed: Dec. 21, 1984

[30] Foreign Application Priority Data

Dec. 30, 1983 [JP] Japan ................. 58-249542
Dec. 30, 1983 [JP] Japan ................. 58-249543

[51] Int. Cl.$^4$ ................. H04N 1/387; H04N 1/46
[52] U.S. Cl. ................. 358/80; 358/75
[58] Field of Search ................. 358/80, 75, 29

[56] References Cited

U.S. PATENT DOCUMENTS

| | | | |
|---|---|---|---|
| 3,324,235 | 6/1967 | Kyte | 358/80 |
| 4,060,829 | 11/1977 | Sakamoto | 358/80 |
| 4,402,015 | 8/1983 | Yamada | 358/80 |
| 4,551,751 | 11/1985 | Jung | 358/75 |
| 4,590,515 | 5/1986 | Wellendorf | 358/75 |

Primary Examiner—Michael A. Masinick
Assistant Examiner—Robert Michael Bauer
Attorney, Agent, or Firm—Zarley, McKee, Thomte, Voorhees & Sease

[57] ABSTRACT

A method for color correction in the process for reproducing a picture in which color separation picture signals obtained by photoelectrically scanning an original picture are converted into picture signals which correspond to four printing color inks including a black ink therein to produce respective reproduction pictures for plate making corresponding to each of the color inks. A picture signal which corresponds to a black ink is produced according to gray color components obtained from B, G and R signals of the original picture, and according to chromatic color components obtained by subtracting neutral color components from said B, G and R signals. Color separation picture signals corresponding to other color inks, and deficiency in reproduction density of the black ink to be used in a black print is corrected by said other three color inks.

7 Claims, 20 Drawing Figures

METHOD FOR COLOR CORRECTION FOR MULTI-COLOR PRINTING PLATE PICTURES

FIELD OF THE INVENTION

The present invention relates to a method for color correction in the high neutral color density range in a process for reproducing a multi-color printing plate picture of all reproducible colors in printings. The method is accomplished by using colors, and principally two colored inks among the set of three colored inks of yellow(Y), magenta(M), and cyan(C). Auxiliarly, black(K) ink has also been used.

DESCRIPTION OF THE PRIOR ART

Conventionally, four color reproduction in the field of printing is achieved mainly by using three colored inks such as yellow(Y), magenta(M) and cyan(C), and in the cases in which the three colored inks are deficient in reproducing a picture having a plurality of color density areas, auxiliarly black(K) ink has been used for the purpose of expanding plural color density areas.

Such a manner of black plate making mentioned above is termed as "skeleton black". On the contrary, there is another form of printing in which the quantity of black color ink for printing is increased for fully utilizing a neutral color component, together with two of the three colored inks, at the most. This manner of printing is termed as "full black manner".

Between these two printing manners, there may be conceived various kinds of printing manners in which, according to the quantity of ink of black print, the quantity of the three color inks, Y, M and C, must be reduced. This is termed to be "under color removal" (UCR).

The more black print resembles the full black print, more various advantages, such as cheaper cost in inks to be used, easier reproductivity in neutral color component and facilitating printing, are expected. However, because of difficulty of judgment in the effect of plate making or other reasons, manners of black print which are relatively closer to the skeleton black plate marking have been prevailingly used, while manners of the full black print or those closer thereto scarcely have been practically used.

Recently, the advantage and excellency of the above described manner of the full black print have been reconsidered, and a printing method, in which neutral color components in the three color inks, Y, M and C are replaced with black(K) ink, has been proposed.

Colors to be reproduced can be reproduced by using from one to three colored inks by replacing the quantity of neutral color with that of K ink at areas in which Y, M and C inks are overlappedly printed, so that, briefly speaking, it means that at all points on a printing each of them can be printed by using at the most any of three colored inks among the four.

Regarding each of the quantities of Y, M and C colored inks, if the quantity of neutral color is replaced with the very one color ink K, the quantity of the ink to be used is reduced, which results in realizing large reduction in cost in the printing fee.

However, in the method for using a conventional color scanner, if all the quantity of neutral color in the three colored inks is merely replaced with K ink in those areas containing quantities of Y, M and C colored inks (i.e., those areas at which density of neutral color is large), density reproducible on a paper to be printed by K ink is insufficient in comparison with that reproduced by a conventional method of overlapping Y, M and C three colored inks with K ink. Thus, no good finished printing result could be obtained.

Accordingly, in conventional color scanners, it has been adapted that nearly 100% UCR (under color removal) can be practiced, and merely K print has been increased accordingly to a quantity of beng subjected to UCR, so that in high density ranges of neutral color, highly qualified reproduction could not be obtained. Thus, no remedy for solving the above mentioned disadvantages could be found, in that any method for saving colored inks in the condition of nearly 100% UCR have not been practiced.

The applicant has already filed applications regarding techniques for color correction and graduation control by separating a color separation signal into chromatic components. These applications are disclosed in the Japanese Patent Laid-Open Publication Nos. 55-115043, 55-142342, 55-142343, 55-142344 and 55-142345.

Particularly, in the Japanese Patent Laid-Open Publication No. 55-115043, there is disclosed a technique for freely correcting and controlling hue and saturation based on the chromatic color component of 100% UCR ratio according to the conventional UCR technique.

In addition, even in other disclosures, the same as the above mentioned, there are some in which chromatic color components are separated from each other in a state of the UCR ratio being 100%, and the chromatic color component is, as it stands, color corrected through a masking circuit, color separation circuit, etc., while the achromatic color component is used as a signal for producing a black print.

SUMMARY OF THE INVENTION

It is an object of the present invention to provide a method for enabling printing, nearly the same as that which has been done conventionally under the condition of 100% or nearly 100% UCR ratio, by adding such a correction that no density areas of a reproduced printing can occur, even if 100% or nearly 100% UCR has been practiced.

That is, in the present invention, the quantity of neutral color of Y, M and C three colored inks are replaced with K ink. Also, by the quantity of the neutral color according to the quantity of deficiency in density of K ink at the high density areas, Y, M and C three colored inks which are balanced with neutral color, are added for defining conventional density and sharpness areas. In case any inconvenience occurs for 100% UCR, a UCR% required quantity corresponding to (100-UCR)% of an ink, in which neutral color of Y, M and C three colors are balanced, is added. As mentioned above, the present invention aims to realize a cost reduction in the printing fee by reducing the quantity of colored inks and at the same time composing a simple circuit for achieving UCR.

Another object of the present invention is to provide a method for obtaining a reproduced picture of high fidelity in the original picture and to realize beautiful color representation.

In order to achieve these objects, in the present invention black print is not used as an auxiliary factor for three color printing in the skeleton manner, but is used as full black manner or those of closer manners thereto. In the case of applying black print as a principal factor, if the gray component is deficient in black print, deficiency in gray reproduction density is corrected by the other three colored inks. Further, correction of any turbid component of the colored inks correction is performed to each of the color plates.

The present invention can be particularly easily applied to those inventions disclosed in the above described publications and can obtain a great effect, and further can be sufficiently applied to those conventional color correction methods using UCR.

DETAILED DESCRIPTION OF THE PREFERRED EMBODIMENT OF THE INVENTION

Figure 1:
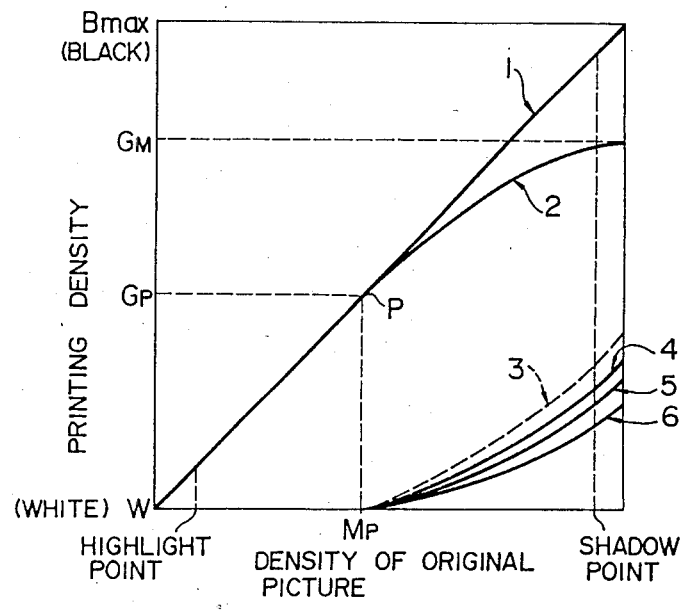
FIG. 1 is a graph relating to density of neutral color of an original picture and printing density, and the density reproductivity characteristic of black ink, and explaining the deficiency in density reproductivity of mere black inks being corrected by three colored inks.

FIG. 1 is a graph showing a halftone dot area ratio when a black print is made from an achromatic color component obtained by separating color(s) into chromatic and achromatic color equivalents to a 100% UCR ratio, and gray density of a black ink printed by the black print. FIG. 1 shows further a manner of correction. As can be clearly seen from FIG. 1, comparison of the density characteristic (2) of an actually used black ink to a density characteristic (1) of an ideal black ink, represents the color density equivalent to the maximum density in the black portion. This has been conventionally obtained by four colors only by one color, and has an inclination of reducing density accordingly to advance to the higher density portion.

To understand the characteristic easier, in FIGS. 1, 7, 10 and 11, the axis of abscissas is linear, but there are also cases in which the axis of abscissas is not linear.

If the kind of black inks to be used in the black print is specified, and also the kind of colored inks to be used in other color plates are specified, portions at which density of the above described black ink is deficient can be corrected by gray density represented by composition of the other three colors: cyan(C), magenta(M) and yellow(Y).

Gray density characteristic (3) is shown in a dotted line showing a gray density which is complementary with that deficient in the black ink.

The complementary gray density characteristic (3) is a well-balanced gray density component by means of three colored inks (C), (M) and (Y), and can be previously obtained as cyan ink density characteristic (4), magenta ink density characteristic (5) and yellow ink density characteristic (6), in accordance with the conditions of printing.

In addition, in the drawings, each of the ink density characteristics (4), (5) and (6) required for obtaining the complementary gray density characteristic is represented in the coordinates of the abscissa, which shows each of the ink color ink densities and the coordinates of which shows density of the original picture. Density of the original picture is shown as a characteristic curve initiating at a point (P) from which attenuation of black ink density begins. On the axis of the abscissa the point (P) is located at a point ($M_p$).

However, it is common that, for example, density area of the original picture does not coincide with that of printing, so that attention should be paid that the drawing is only a diagrammatical one.

In the drawing ($G_p$) indicates gray density at the point (P), ($G_m$) indicates the maximum gray density obtained only by a black ink, ($B_{max}$) shows the maximum gray density (black) required for a printing, and (W) is the minimum gray density (white) of the printing.

A highlight point (white) and a shadow point (black) on the original picture in a print plate making are to be reproduced as approximate values to the minimum gray density (W) (described above) and the maximum gray density ($B_{max}$) (described above), so that on operating the color scanner, for example, printing halftone dot ratio is previously set up to 5% and 95%.

In the above described setup state, when the UCR ratio is 100%, the black print signal in neutral color portion becomes complete full black manner and according to ideal black ink density characteristic (1), it is formed so as to reproduce gray density from W to $B_{max}$ linearly.

However, in practice, because of insufficient density reproduction of the black ink, at densities higher than that of the original picture ($M_p$) there occurs density deficiency. It is possible to know previously the gray density components corresponding to the above described insufficient quantity by corresponding them to the printing density of the black print. From the printing density, the deficient quantity (components of the three colored inks) to density of the ideal ink can be obtained through test prints. Accordingly, color components of three colors corresponding to complementary three color gray density characteristic are recorded in a memory means as a lookup table. By addressing the lookup table with achromatic color components, the gray component, which is insufficient with the black print, only is read out as color components of three colors, and by adding each of the color components to each signal of the corresponding color plates, color correction for compensating deficiency in density reproductivity of the black ink can be achieved.

Thus, the method is applied not only to the case of the UCR ratio being 100%, but can be applied to other cases in which UCR ratio is not 100%. In the latter cases, the present method can also be practiced in a similar manner as mentioned above, without subtracting UCR signal from the conventional Y, M and C signals containing chromatic color eand achromatic color components.

Figure 4:
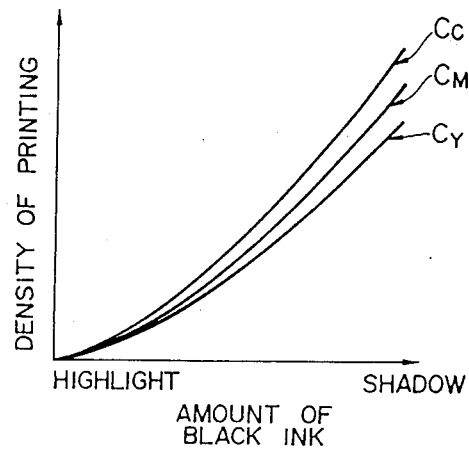
FIG. 4 is a graph showing characteristics of three colored inks $C_c$, $M_c$ and $Y_c$ necessary for obtaining an equivalent neutral color density of a printing to that of black ink.

That is, FIG. 4 is a view showing an equivalent characteristic of the characteristic of the black ink shown in FIG. 1 in the case of being reproduced by Y, M and C three colored inks.

When the quantity of the black ink is assumed, for example, to K, and necessary percentage of UCR to U, the quantity of an ink to be added is $K \times (100-U)/100$, which corresponds to $K \times (100-U)/100$ % of black ink.

The above described fact can be realized by adding quantities of $C_c$, $M_c$, and $Y_c$ colored inks shown in FIG. 4 to colored inks Y, M and C.

If the above described relationship between K and U is stored in the lookup table, a necessary number of lookup tables may also be provided, for example, by scaling the value of U (percentage of UCR) by every one %.

In the present method, the memory means is addressed by an achromatic color component signal or a black print signal of full black manner to read out densities of each of the color plates corresponding to gray density which is deficient in the addressed portion. Each of the gray density signals of respective colors is added to each picture signal of the respective color plates to increase deficiency in gray density in the black print. Thus, according to the present invention, color correction can be achieved.

Figure 2:
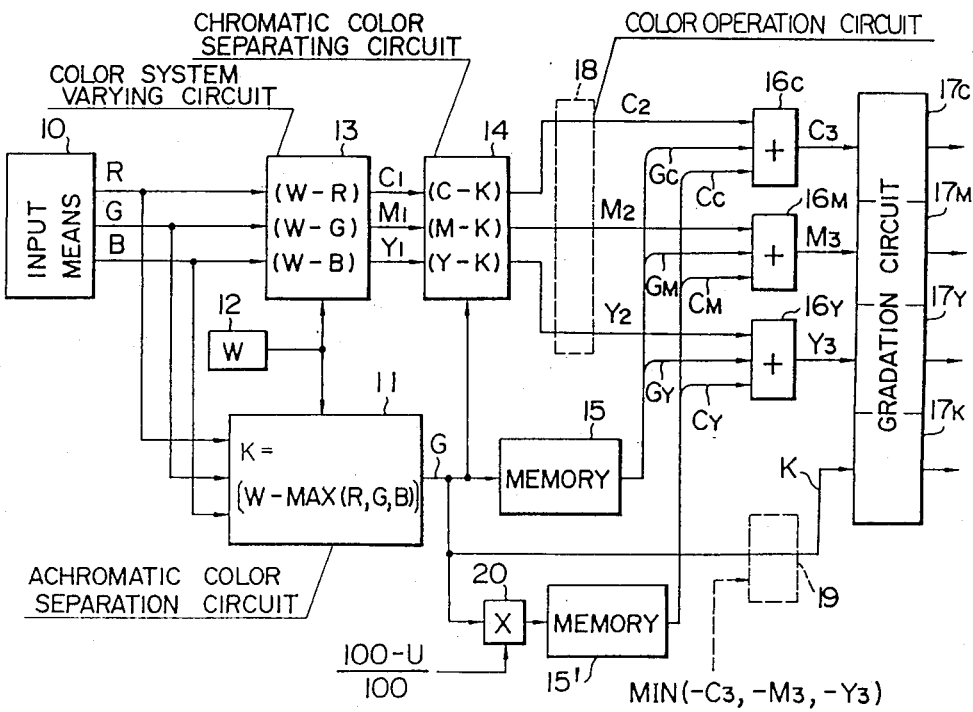
FIG. 2 is a block diagram of color correcting parts of a color scanner, which shows one embodiment of the method according to the present invention.
Figure 3:
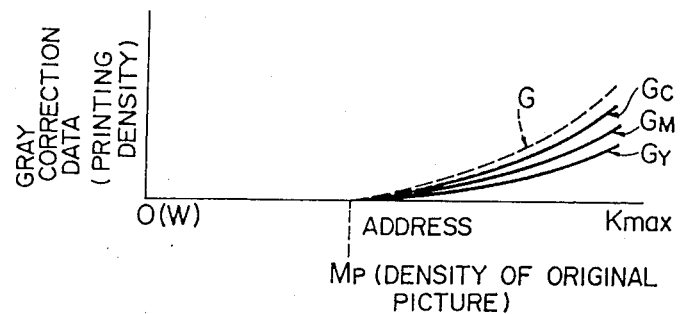
FIG. 3 is a graph showing characteristics of a lookup table of a memory means.

FIG. 2 is a block diagram illustrating an actual operational manner of the color correction method of the present invention in which deficiency in gray density reproduction regarding the above mentioned black print is being corrected.

The reference number (10) designates an input means of a color scanner, and it outputs three color separation picture signals (R), (G) and (B) of an RGB color system obtained by photoelectrically scanning the original picture.

In addition, each of processing circuits and each of signals which are hereinafter explained are digital circuits and digital signals, so that hereinafter abbreviation in expressing of the word "digital" is done.

Each of the picture signals (R), (B) and (B) is input to an achromatic color separation circuit (11) in which an achromatic color component for producing a black print signal (K) is selectively separated from any of the largest in the picture signals (R), (G) and (B) and extracted.

In the achromatic color separation circuit (11), value (W) of white level corresponding to the highlight point of the original picture is previously set by a register (12), and the achromatic color separation circuit (11) generates the achromatic color component signal or the black print signal (K) of full black manner by operating in accordance with the following formula:

$$K = [W - MAX(R, G, B)] \quad (1)$$

Here, MAX(R, G, B) designates a signal selected as having the largest value in each of the picture signals (R), (G) and (B) at every pixel being scanned in the original picture.

Figure 5:
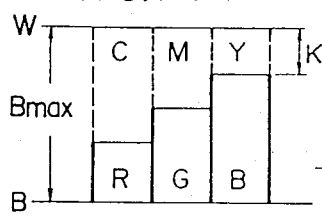
FIGS. 5(a), (b) and (c) are graphs of signals showing the processes of color system conversion of color separation picture signals.

For example, when each of the picture signals (R), (G) and (B) are in the level shown in FIG. 5(a), the picture signal (B) is selected as the MAX(R, G, B).

In the formula (1) the selected picture signal (B) is subtracted from the value of white level (W), and value of the difference is set as an achromatic color signal (K).

Figure 5B:
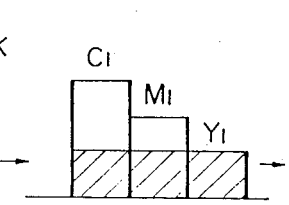

Each of the picture signals (R, (G) and (B) is input to a color system varying circuit (13) which converts RGB system color separation picture signals into YMC system color separation picture signals, and the color system varying circuit (13) subtracts each of the picture signals (R), (G) and (B) from the respective color signals (R), (B) and (B), according to complementary relations, $Y = W - B$, $M = W - G$, and $C = W - R$, and converts, as shown in FIG. 5(b), them into picture signals $(C_1)$, $(M_1)$ and $(Y_1)$ of YMC color system.

Each of the color signals $(C_1)$, $(M_1)$ and $(Y_1)$ is input to a chromatic color separation circuit (14), and the chromatic color separation circuit (14) subtracts the achromatic color component signal (K) from each of the picture signals $(C_1)$, $(M_1)$ and $(Y_1)$.

Figure 5C:
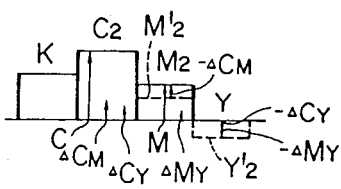

The achromatic color component signal (K), i.e., the black print signal, has, as shown in FIG. 5(a) and (b), at least one identical value with the picture signals $(C_1)$, $(M_1)$ and $(Y_1)$. As a result, the signals output from the chromatic color separation circuit (14) are composed of, as shown in FIG. 5(c) and considered as to each of pixels, at the most two, among picture signals $(C_2)$, $(M_2)$ and $(Y_2)$.

The achromatic color component signal (K) is digitalized by an A/D converter (not shown), and the digital value is transmitted to a memory means (15). The memory means (15) reads out gray corrected data (ΔG) according to the value of the achromatic color component signal (K).

The gray corrected data (ΔG) stored in the memory means (15) are stored in a lookup table manner so that each of the colored ink components $(\Delta G_c)$, $(\Delta G_M)$ and $(\Delta G_Y)$ of the gray corrected data may be obtained from each of the colored ink density characteristics which correspond to the complementary gray characteristic (3) shown in FIG. 1.

Each of the color ink components $(\Delta G_C)$, $(\Delta G_M)$ and $(\Delta G_Y)$ is transmitted to respective adders (16C), (16M) and (16Y) to which each of the chromatic color picture signals $C_2$), $(M_2)$ and $(Y_2)$ is input, respectively.

The addresses (16C), (16M) and (16Y) add the chromatic color picture signals $(C_2)$, $(M_2)$ and $(Y_2)$ to each of the color ink components $(\Delta G_C)$, $(\Delta G_M)$ and $(\Delta G_Y)$ for gray correction so that each of the corresponding colors may be added, respectively. Each of the outputs of the respective adders is transmitted as a cyan plate signal $(C_3)$, a magenta plate signal $(M_3)$, and a yellow plate signal $(Y_3)$, to each of graduation circuits $(17_C)$, $(17_M)$, $(17_Y)$ and $(17_K)$ which are disposed at the after stage thereof, together with the achromatic color component signal, i.e., the black print signal (K) in the full black manner.

Further the (K) signal is input to a multiplier (20). The other input of the multiplier (20) is given as $(100-U)/100$.

The multiplier (20) performs the following multiplication, that is, quantity of black ink $K \times ((100-U)/100)$ is carried out, and addresses a lookup table (15') by addressing the output thereof. As a result, each of quantities of the color inks $C_C$, $C_M$ and $C_Y$ of the respective Y, M and C corresponding to $K \times ((100-U)/100)$ shown in FIG. 4 is output.

The output of the above described are input, in the same manner, to the addresses $(16_C)$, $(16_M)$ and $(16_Y)$ to correct the quantity to be remained as UCR.

Thus, deficiency in density reproductivity of the black ink is corrected by each of the color components gray density of which corresponds to the deficiency. With the result, the gray density equivalent to the characteristic (1) of the ideal black ink shown in FIG. 1 can be obtained on the reproduction picture.

On the other hand, considering color inks, the corrected color data $(\Delta G_C)$, $(\Delta G_M)$ and $(\Delta G_Y)$ are previously determined so that gray balance including turbid components of color inks being used may be matched. Accordingly, wherever gray density areas to be corrected may be, no influence can be given to hue at all. However, correction for turbid components of actual inks is necessary for the chromatic color picture signals $(C_2)$, $(M_2)$ and $(Y_2)$. For this reason, at the after stage of the chromatic color separation circuit (14), there is provided a color operation circuit (18) to correct turbid components of inks of color plates.

To the color operation circuit (18), a calculation method for color correction, which has been already filed by the present applicant and published as the Japanese patent Laid-Open Publication No. 55-115043, a masking circuit, a color correcting circuit, etc., having been disclosed in the Japanese patent Laid-Open Publication Nos. 55-142342 to 55-142345 also filed by the Applicant, can be directly applied without any further modification.

Further, as to the color operation circuit (18), it is preferred that such which comprises a fundamental masking circuit relying on conventional masking equations, a color correction circuit which carries out appropriate color correction, an under color removing circuit, etc., may be directly applied thereto.

However, the black ink print signal (K) in the above mentioned full black manner produces a black print in a state of an UCR ratio 100% of the conventional UCR method, so that if masking treatment is carried out on the chromatic color signals $(C_2)$, $(M_2)$ and $(Y_2)$ produced by the aforementioned, there occurs some cases in which as quantities of inks to be used, negative values may be required of each of resultant color plate signals of $(C'_2)$, $(M'_2)$ and $(Y'_2)$. In such cases, a subtractor (19) is provided at the preceding stage to the memory means (15), the minimum (absolute value is the largest) among the picture signals of negative values corresponding to the quantities of the inks is selected, then the minimum signal is subtracted from the black print signal (K), and the subtracted gray component is changed by each of the color ink components in a color correction circuit (18b). Thus, the impropriety that the quantity of ink is a negative value can be solved.

While in a pair of circuits of the achromatic color separation circuit (11), and the chromatic color separation circuit (14), the color correction circuit (18) is disposed immediately to the rear stage of the achromatic color system varying circuit (13), and between the color correction circuit (18') and the adder (16c), the chromatic color separation circuit (14) is disposed. (In the case of the color correction circuit (18) is shifted to the rear stage as above mentioned. Then it is referred to the color correcting circuit (18'). Further, inputs of the achromatic color separation circuit (11) are outputs obtained from the color system varying circuit (13) and the color correction circuit (18'). Thus, the output of the achromatic color separation circuit (11) may be a signal which corresponds to a value of the formula $[W - MAX(R, G, B)]$.

In each of the colored inks there are turbid components. As a main part of which cyan (C) contains a turbid component $(\Delta C_M)$ of magenta (M) and a turbid component $(\Delta C_Y)$ of yellow (Y), and as another main part of which magenta (M) contains a turbid component $(\Delta M_Y)$ of yellow (Y).

The masking circuit outputs each of the color picture signals $(C'_2)$, $M'_2)$ and $(Y'_2)$ by subtracting each of these turbid components from the corresponding respective colors.

In this case, for example, as shown in FIG. 5(c), if cyan (C) and magenta (M) are determined to be predominant colors, and each of the picture color signals $(DC'_2)$, $(M'_2)$ and $(Y'_2)$ corresponds to a UCR ratio of 100%, then a quantity of negative value of $-(\Delta C_Y + \Delta M_Y)$ is required for yellow (Y). This inconvenience can be eliminated by carrying out masking treatment at the preceding stage of the chromatic color separation circuit, but this configuration has no adoptability for the conventional circuit construction, and a further problem lies in that those color inks Y, M and C actually used as not the ideal ones, but each of them has its spectral reflection characteristic which results from other color ink components being contained therein, respectively.

This means that in the case of the UCR ratio being 100%, the quantity of components of other color inks which are contained in each of the quantities to be subtracted from the respective color inks is liable to be subtracted excessively in comparison with the case of the ideal ink being applied. That is, in any inks actually used, particularly in cyan ink, there are contained considerably large quantities of Y ink and M ink components, so that, for example, if 100% UCR ratio is carried out to reduce C ink as the MIN(minimum) ink quantity to zero, then components of Y ink and M ink are exhausted, which results in deficiency of the whole quantity of the Y and M inks.

Hereinafter methods for solving the above described problems will be disclosed.

The present invention provides a method for color correction in which a suitable black print signal is produced for each of the color plate signals $(C'_2)$, $M'_2)$ and $(Y'_2)$ having been performed the above described masking treatment are even for over-subtraction, i.e., for subtraction having been performed excessively to color components in 100% UCR ratio caused by difference between color inks actually used and the ideal color ink, and an appropriate correction to each of the color plate signals $(C_2')$, $(M_2')$ and $(Y_2')$ according to the black print signal.

Figure 6:
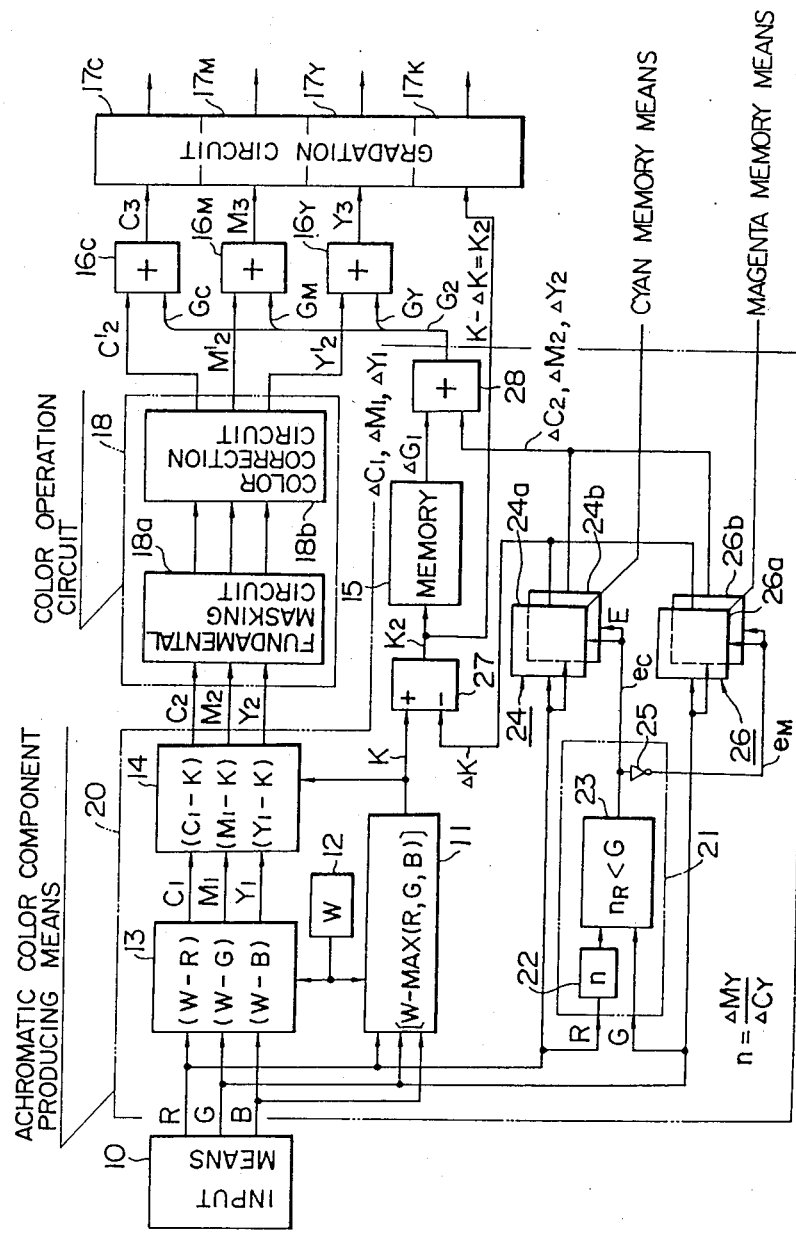
FIG. 6 is a block diagram of a color correction part of a color scanner showing an embodiment of the present invention.
Figure 7A:
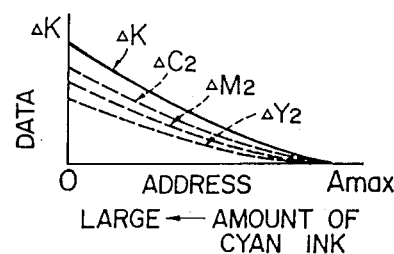
FIGS. 7(a)-(d) are graphs which show memory contents of the main memory means shown at FIG. 6.
Figure 7C:
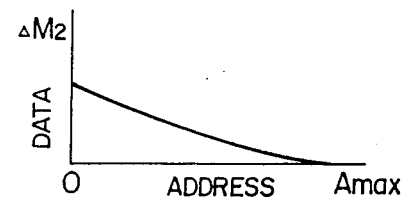
Figure 7B:
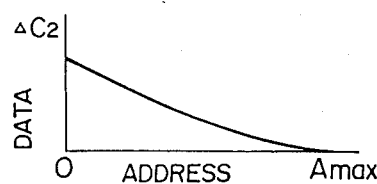
Figure 7D:
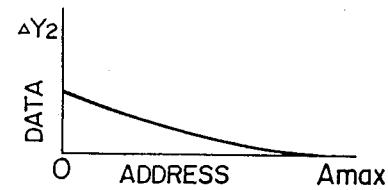

In FIG. 6 there is shown the first embodiment of the present invention in which a novel circuit for solving the problems of requiring a negative quantity of ink based on turbid components of color inks is added to the circuit relating to the black print signal which corrects the deficiency of density reproductivity of the black ink shown in FIG. 1. In FIG. 6 detailed explanation regarding those identical parts shown in FIG. 1 are abbreviated.

The achromatic color component generating means (20) consists of a main part of the present invention. The color operation circuit (18) is comprised of the fundamental masking circuit (18a) and the color correction circuit (18b).

There are much turbid components of colored inks in cyan(C) ink and magenta(M) ink, but extremely little or negligibly little in yellow(Y) ink.

Considering that fact, the predominant color discriminating circuit (21), which discriminates a predominant color including more turbid components from cyan(C) and magenta(M), is included in the achromatic color component generating means (20).

The predominant color discriminating circuit (21) inputs a red picture signal (R) and a green picture signal (G), and both of the picture signals (R) and (G) are compared with each other by a comparator (23) after the red picture signal (R) has been weighted (n) times by a weighting means (22).

In essence, the red picture signal (R) corresponds, as shown in FIG. 5(a), to the quantity of cyan ink (C), and the green picture signal (G) corresponds to the quantity of magenta ink.

The weighted quantity n weighted by the weighting means (22) is represented by the rate between turbid components ($\Delta C_Y$), ($\Delta M_Y$), of yellow(Y) which are included in the identical quantity of cyan (C) and magenta (M) inks, that is $n = \Delta M_Y / \Delta C_Y$.

The comparator (23) outputs, in the condition of nR<G (nC>M), acyan color discrimination signal ($e_C$) which enables a cyan memory means (24), and the cyan color discrimination circuit ($e_C$) is inverted by an inverter (25). When nR>G (nC<M), the cyan color discrimination signal ($e_C$) is converted into a magenta color discrimination signal ($e_M$) which enables a magenta memory means (26).

As can be understood from the above description, the comparator (23) compares the required quantity of cyan ink with the effective quantity of the turbid components $\Delta C_Y$ and $\Delta C_M$ contained in the required quantity of magenta ink, and discriminates an ink color larger thereof.

Each of the cyan memory means (24) and the magenta memory means (26) is addressed by the corresponding respective color picture signals (R) and (G), and when either of the color discriminaton signals ($e_C$) or ($e_M$) enables the memory means (24) or (26), read out data stored therein previously (as will be described hereinafter), according to values of the picture signals (R) and (G).

The memory means (24) comprises a gray table (24a) which stores gray density data ($\Delta K$) for correcting the black print, and color correction table (24b) which stores color correction data ($\Delta C_2$), ($\Delta M_2$) and ($\Delta Y_2$) of each gray density equivalent to that of the gray density data ($\Delta K$). Quite the same as mentioned above, the memory means (26) comprises a gray table (26a) which stores gray density data ($\Delta K$) for correcting the black print, and a color correction table (26b) which stores color correction data ($\Delta C_2$), ($\Delta M_2$) and ($\Delta Y_2$) of each gray density equivalent to that of the gray density data ($\Delta K$).

In FIG. 7 there are shown contents of each of the tables of the cyan memory means (24), in which (a) indicates the gray table (24a), (b) indicates a cyan color correction table, (c) is a magenta color correction table and (d) is a yellow color correction table.

In the gray table (24a), i.e., in (a), gray density ($\Delta K$), which corresponds to a yellow color equivalent neutral density being equal to twice value of turbid components ($\Delta C_Y$), is stored corresponding to the whole cyan ink area. The reason why $\Delta C_Y$ is doubled is that, when there is a nearly equivalent quantity of turbid components $\Delta M_Y$ of magenta ink, the whole turbid components become about two times as large.

In each of the color correction tables (a)–(d), the gray color correction data ($\Delta C_2$), ($\Delta M_2$) and ($\Delta Y_2$) corresponding to the gray poupard ($\Delta K$) of the gray table (24a) are stored.

Same as mentioned above, the magenta memory (26) defines the contents of the gray table (26a) according to the doubled value of turbid component ($\Delta M_Y$) of magenta, and according to the gray density of the gray table (26a), the contents of each color correction table (26b) are defined.

The contents of the gray table (24a) or (26a) and the color correction table (24b) or (26b) are, if measured in gray density based on results of color prints, quite identical with each other. The only difference between them is whether a carrier which represents only gray density is a black ink on three colored inks.

The gray density data ($\Delta K$) read out of the gray table (24a) or (26a) is subtracted from the full black print signal (K) through a subtracter (27).

Output of the subtracter (27) addresses the memory means (15) as a corrected black prinft signal ($K_2$).

The memory means (15) reads out the first gray density correction data ($\Delta G$) which corresponds to the deficiency in reproduction density of the blank ink.

Each of the color components ($\Delta C_1$), ($\Delta M_1$) and ($\Delta Y_1$) of the first gray correction data (G) is added by an adder (28) to each of the color correction ($\Delta C_2$), ($\Delta M_2$) and data ($\Delta Y_2$) read out of the color correction table (24b) or (26b) so that each of the corresponding colors may be added with each other. The adder (28) outputs the record gray correction data ($G_2$) and transmits it to each of the adders ($16_C$), ($16_M$) and ($16_Y$).

The corrected black print signal ($K_2$) is transmitted to a gradation circuit ($17_K$) as a picture signal for the black print. The gray density data ($\Delta K$) and the color correction data ($\Delta C_2$), ($\Delta M_2$) and ($\Delta Y_2$) read out of the memory means (24) and (26) are replaced by their identical gray density components with each other between each of the color plates and the black print, then no change in color reproductivity can occur, i.e., there cannot be found any difference in color reproductivity, if the gray density components of the former are replaced with the equivalent gray density of the latter (the black print).

However, to each of the masking treated picture color signals ($C_2'$), ($M_2'$) and ($Y_2'$), according to the color ink which is predominant in turbid components, a quantity of three colored inks equivalent to that of the gray component which corresponds to the turbid components included in the color ink is added. Accordingly, no case of requiring a quantity of negative value ink occurs.

In the embodiment shown in FIG. 6, the quantity of three colored inks C, M and Y is limited to the possible smallest quantity of the ink so as not to produce a negative value thereof. If the aforementioned limited state is represented by the UCR ratio of the conventional UCR method, it may be said that the UCR ratio can be variably adjusted so that it may be maintained at the largest value by always keeping the optimum condition therefor accordingly to turbid components of the colored inks.

In other words, it may be also said that the used quantity of inks is automatically variably controlled according to turbid components of the colored inks.

Figure 8:
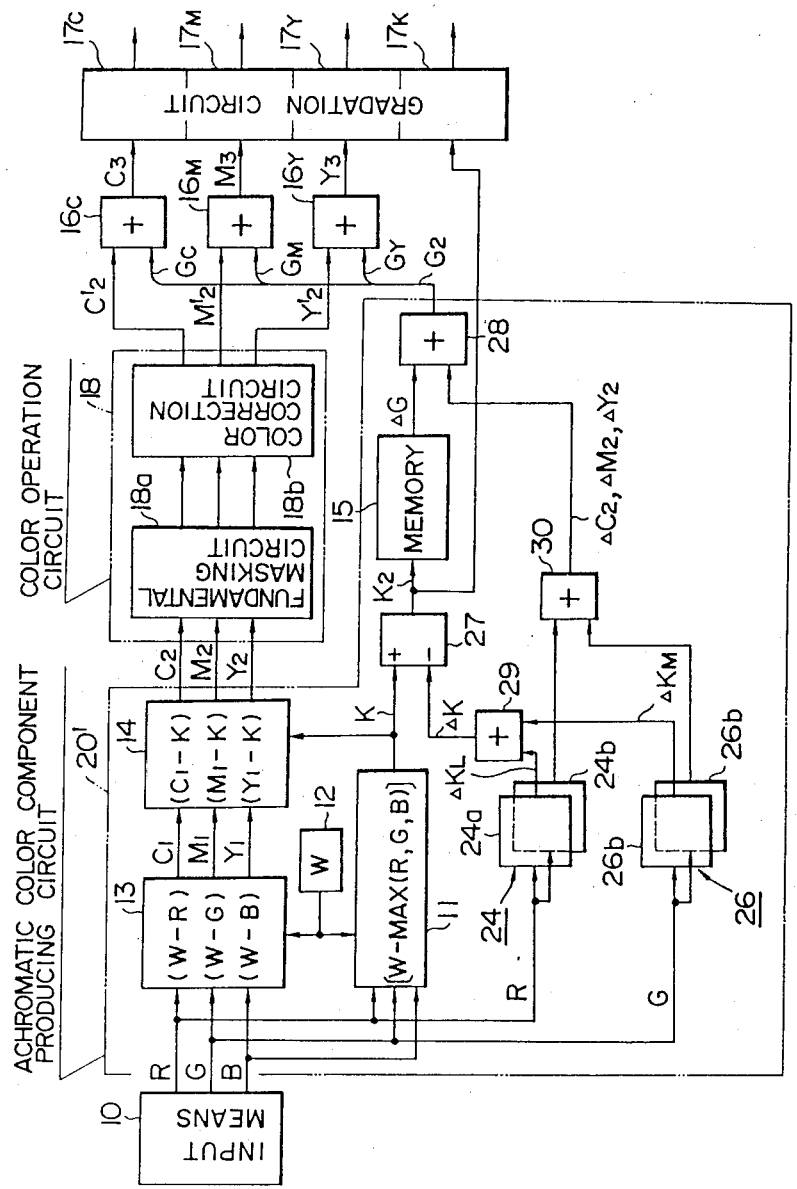
FIG. 8 is a block diagram of the color correction part of the color scanner which shows a modification of the embodiment shown in FIG. 6.

FIG. 8 shows a view showing a simplified achromatic color components generating means (20) shown in FIG. 6.

The achromatic color components generating means (20') shown in FIG. 8 eliminates the predominant color discriminating circuit (21), and directly and simultaneously accesses the cyan memory means (24) and the magenta memory (26) by the red picture signal (R) and the green picture signal (G), respectively. In this case gray density data ($\Delta K_C$) and ($\Delta K_M$) output simultaneously from those both memory means (24) and (26) are once added to each other in an adder (29), and the added result is transmitted as a gray data ($\Delta K = \Delta K_C + \Delta K_M$) for gray density correction to the subtractor (27).

The color correction data read out simultaneously from both memory means (24) and (26) are added in an adder (30) so that each of those corresponding colors may be added, and then transmits them as the color correction data ($\Delta C_2$), ($\Delta M_2$) and ($\Delta Y_2$) to the adder (28).

The gray and the color correction data to be stored in the memory means (24) and (26) may be a half of the gray density value shown in FIG. 6, that is, it may be the turbid components of the inks themselves or may somewhat increase the turbid components. As each of cyan and magenta shares its turbid components respectively, any extra quantity of turbid components for correction in anticipation of the worst condition is unnecessary.

Therefore, according to this embodiment, it is expected that the quantity of inks to be used can be further reduced in comparison with the case of other embodiments shown in FIG. 6.

Figure 9:
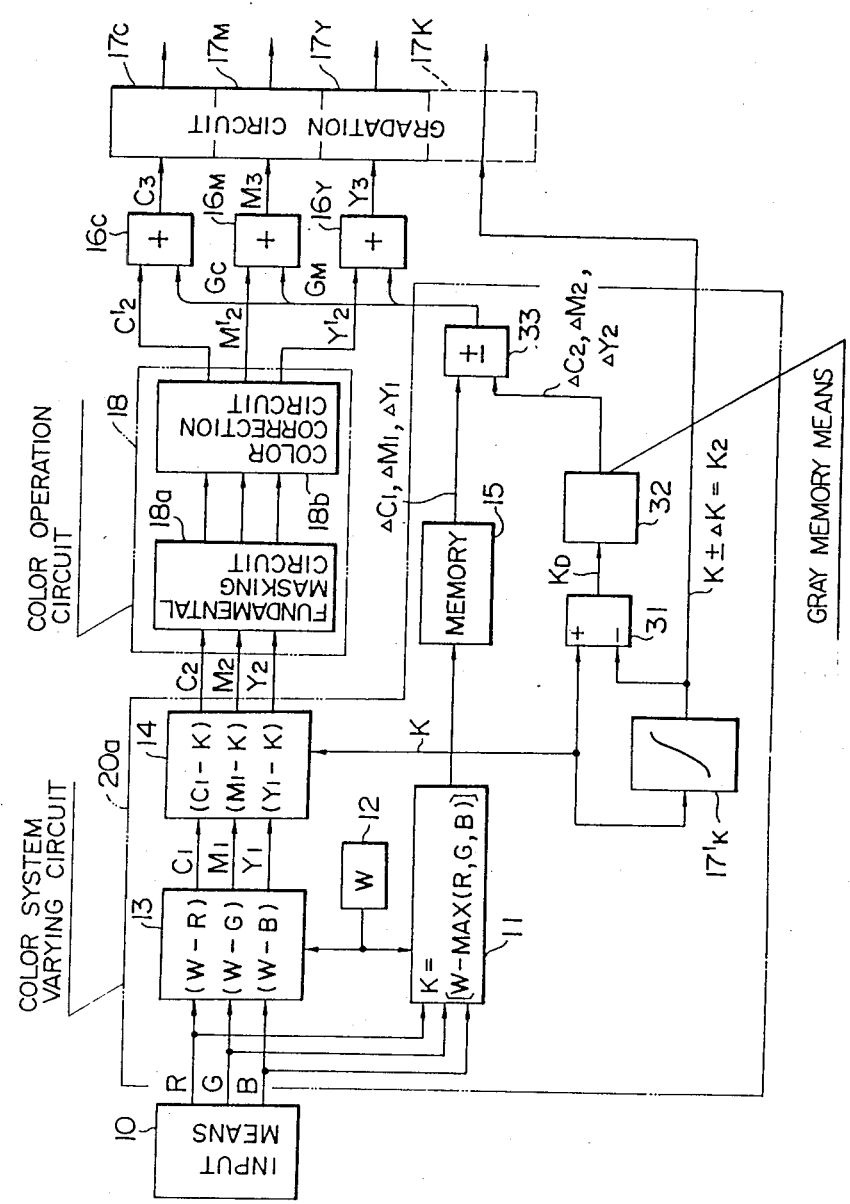
FIG. 9 is a block diagram of the color correction part of the color scanner of another embodiment of the present invention.

FIG. 9 shows another embodiment of the achromatic color component generating means designated by the reference number (20a).

The full black print signal (K) addresses, as shown in FIG. 1, directly the memory means (15), and is transmitted to an input for addition of a subtracter (31) and a gradation circuit ($17_K'$) for the black print.

An output of the gradation circuit $17_K'$) is transmitted to an input for subtraction of the subtracter (31) and output as the picture signal ($K_2$) for the black print. The subtracter (31) subtracts the black print picture signal ($K_2$) output from the gradation circuit ($17_K'$) from the full black plate signal (K), and outputs density difference ($K_D$) between them.

Figure 11:
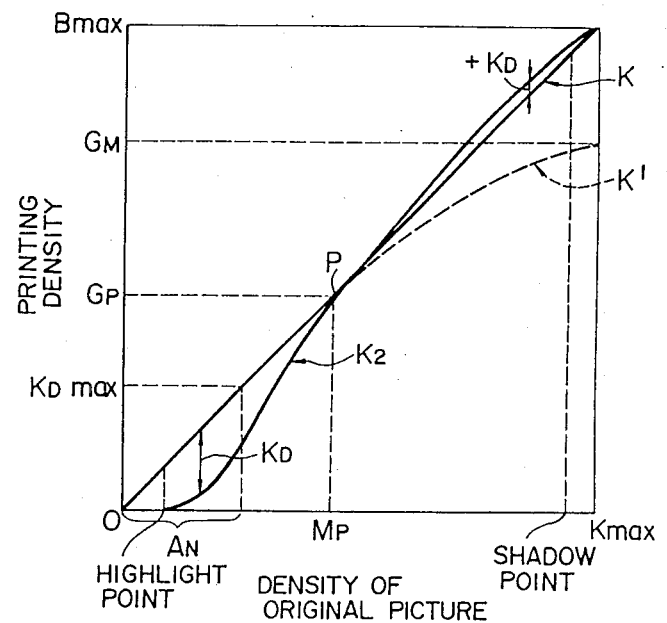
FIG. 11 is a graph which shows characteristic curves of the main signal shown in FIG. 9.

Each of the correction data ($C_1$), ($M_1$) and ($Y_1$) output from the memory means (15) is added, as described above, to the respective three color plate signals ($C_2'$), ($M_2'$) and '$Y_2'$), and by combining each of them with the black print signal ($K_2$), the ideal achromatic color density characteristic shown in FIGS. 1 and 11 can be obtained.

The gradation circuit ($17_K'$) has a memory table or a random function generating means using a linearizer and can produce any desired characteristic curve of the relation between input and output. For example, as shown in FIG. 1, it is possible to change the black print signal (K) as the curve ($K_2$).

The density difference ($K_D$) is a difference between the curve (K) and the curve ($K_2$), and the reproductive characteristic of gray density of this density difference ($K_D$) has, at any density area, always linear gray density reproductivity.

For example, in the case of density components corresponding to the density difference ($K_D$) being replaced with those of three colored inks, an appropriate gray density can be obtained in density areas lower than the point (P), however, in density areas higher than the point (P), because of gray density being deficient as shown in the curve (K'), any appropriate correction cannot be carried out, even if gray density components corresponding to the density difference ($K_D$) are added thereto.

Such being the circumstances, in the present invention it is adapted that by a signal of the density difference ($K_D$), a gray memory means (32) is addressed, and from the gray memory means (32) each of the color correction signals ($\Delta C_2$), ($\Delta M_2$) and ($\Delta Y_2$) having an equivalent neutral color density equal to the density difference ($K_C$) can be obtained. FIG. 10 shows contents of the memory means (32) in which (a) indicates total gray density characteristic which is linear in the whole address areas (the whole density difference areas).

Figure 10A:
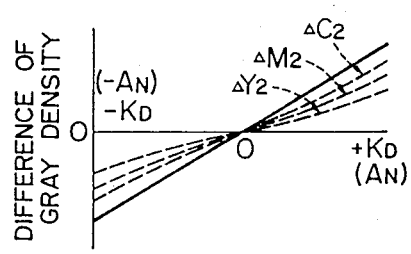
FIGS. 10(a)-(d) are graphs which show memory contents of the main memory means shown in FIG. 9.
Figure 10C:
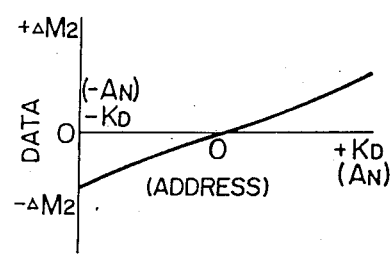
Figure 10B:
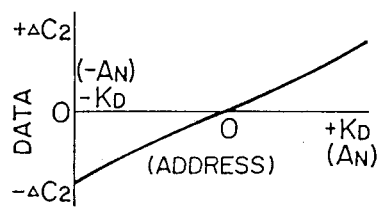
Figure 10D:
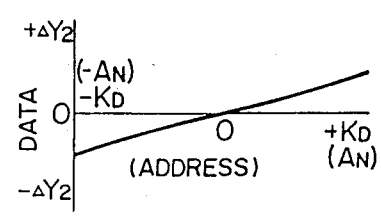

FIG. 10(b), (c) and (d) shows each color correction quantity for obtaining a gray density characteristic as shown in FIG. 10(a), in which (b) indicates cyan components ($\Delta C_2$), (c) indicates magenta components and (d) is a yellow component ($\Delta Y_2$).

Within address space of the memory means (32) having the above described characteristics, the required maximum density difference ($K_{D\ MAX}$) is appropriately determined in accordance with the variable range of the gradation circuit ($17_K'$), and the memory means (32) can be addressed by either positive or negative value of the maximum density difference ($K_{D\ MAX}$).

The correction data ($\Delta C_2$), ($\Delta M_2$) and ($\Delta Y_2$) output from the memory means (32) are transmitted to an adder-subtracter (33) by attaching a positive and/or negative sign. The adder-subtracter (33) carries out addition-subtraction operation between the correction data ($\Delta C_1$), ($\Delta M_1$) and ($\Delta Y_1$) output from the memory means (15) and the correction data ($\Delta C_2$), ($\Delta M_2$) and ($\Delta Y_2$) of the memory means (32) so that addition and/or subtraction may be performed between the corresponding ink colors. The adder-subtracter (33) transmits the results of addition and/or subtraction therebetween to the adders ($16_C$), ($16_M$) and ($16_Y$) as the gray correction data ($\Delta G$).

In the embodiment, by varying the gradation characteristic of the black print, the gradation characteristic is shifted appropriately from that of the ideal ink, and correction is performed so that gray density of the shifted portion may be replaced with gray density of each of the color plates.

Gradation characteristic can be varied freely, so that at any gray density areas the conventional UCR ratio can be freely changed.

This effect makes it possible to control the black print in quite the same manner as that of the conventional UCR method in which, for example, as shown in FIG. 11, gray density can be represented without using any black ink in the lower gray density areas.

However, quite different from the UCR method, according to the present invention, the quantity of gray density to be controlled can be easily grasped.

Figure 12:
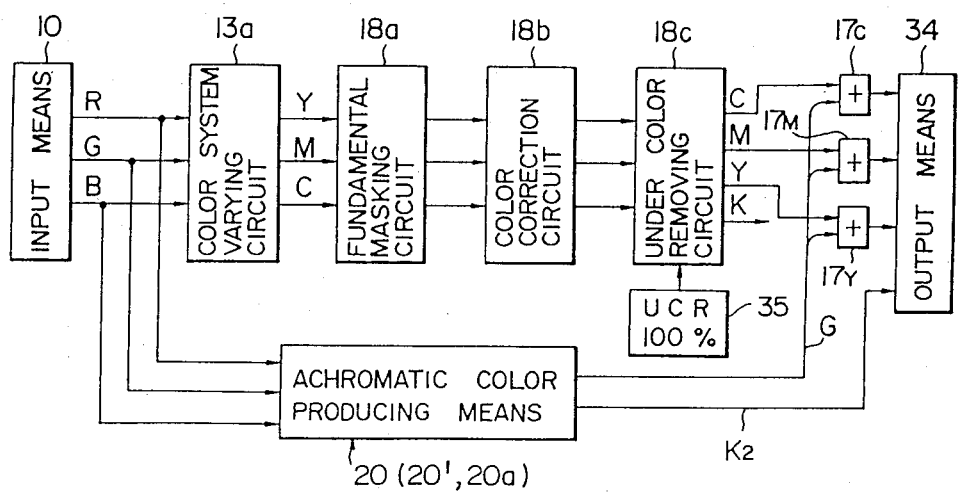
FIG. 12 is a block diagram showing a manner of applying the present invention to a conventional color scanner.

In FIG. 12 there is shown an example in which the present invention is applied to a color scanner having a conventional UCR circuit and being in its operating state.

Circuits having been described heretofore have been already disclosed in the Japanese Patent Application Laid-Open Publication No. 55-115043, and from Nos. 55-142342 to 55-112345, and/or those of well-known digital circuit techniques, so that no detailed explanation is needed.

The color scanner, having been already installed and operated, comprises the input means (10), the color system varying circuit (13a), the fundamental masking circuit (18a), the color correction circuit (18b), the under color removing circuit (18c) and an output means (34) for reproducing the picture.

Any one of the black print generating means (20), (20'), or (20a) described as the embodiments of the present invention is provided to this color scanner and each of the picture signals (R), (G) and (B) is input thereto from the input means (10).

In the above mentioned case, the black print signal ($K_2$) obtained from the black print generating means (20) is used as a picture signal(s) for black print. Further, even in the case of the conventional color scanner being operated in an analog circuit, the present invention can be operated in an analog circuit, the present invention can be applied if an AD converter (not shown) is connected to the input of the black print generating means (20), (20'), or (20a) and a DA converter (not shown) is connected to the output of the black print generating means (20), (20') and (20a).

The under color removing circuit (18c) sets the UCR ratio to 100% by an under color removal ratio setting means (35), and a signal for black print obtained therefrom is not applied.

The gray density correction signal (G) is added to each of color ink picture signals (Y), (M) and (C) through the adders ($17_C'$), ($17_M'$), and ($17_Y'$).

As described above, the color correction method according to the present invention can be practiced, even to the color scanner having been actually equipped and operated within such things as the adders ($17_C'$), ($17_M'$), ($17_Y'$), etc. because it can be provided without making any large scale of change and trouble.

As described in detail, according to the present invention, it is possible to reduce unnecessary consumption of expensive colored inks by converting always gray components into black print at their maximum and reducing the quantity of inks to be used at their minimum, reproduce a picture having less turbidity in comparison with that reproduced by the conventional method, and it is also possible to easily control color correction of other color inks and facilitate correction of colors so as to represent desired color effects. In addition, there are further advantages in the present invention, for example, by correcting deficiency in density reproduction of the black ink according to the density characteristic of the black ink. The deficiency in gray density of the black print can be easily shared by three color plates, thus, by controlling the shared quantity of gray density appropriately, and restraining the quantity of colored inks to be used as much as possible, incomplete reproductivity in tone which has been a serious disadvantage of using the black print according to the conventional full black manner is avoided. Thus, according to the present invention appropriate color tone reproductivity can be realized.

What is claimed is:

1. A method for color correction in the process for reproducing pictures, in which color separation picture signals obtained by photoelectrically scanning an original picture are converted into other color separation picture signals which correspond to multi-color printing inks, including a black ink therein to produce respective reproduction pictures for plate making corresponding to each of the ink colors, comprising the steps of:

producing a picture signal corresponding to a black ink based upon a gray component from B, G or R picture signals;

obtaining color separation picture signals which correspond to each of the other ink colors by chromatic color components which are produced by subtracting a neutral color component from said B, G and R signals;

obtaining neutral color density corresponding to the deficiency in neutral color reproductive density of the black ink according to a picture signal of the neutral color component;

converting said neutral color density into each of the color components of neutral color densities obtained from other color inks; and adding each of said color components to each of said ink color picture signals, according to the respective corresponding colors.

2. A method for color correction according to claim 1, further comprising the steps of:

multiplying the quantity of said black ink by a coefficient ($1-U$), wherein U is a necessary quantity of UCR; and substituting neutral color density of a print for three colored inks Y, M and C based on the resultant quantity of black ink obtained by the multiplication.

3. A method for color correction in the process for reproducing pictures, in which color separation picture signals obtained by photoelectrically scanning an original picture are converted into other color separation picture signals which correspond to multi-color printing inks, including a black ink therein to produce respective reproduction pictures for plate making corresponding to each of the ink colors, comprising the steps of:

correcting the deficiency in reproduction density of a black ink to be used for a black print by three other colored inks; and converting an appropriate gray density in the black print into an equivalent neutral color density of three colored plates equal to said gray density, when the quantity of any of said three colored inks becomes a negative value resulting from color correction for removing turbid components in each of said colored inks.

4. A method for color correction according to claim 3, wherein said appropriate quantity of gray density of said black print is determined according to a high density value of turbid components of each of the colored inks to be used in the respective color plates.

5. A method for color correction according to claim 3, wherein said appropriate quantity of said gray density of said black print is determined based on the density difference between a black print signal prior to gradation being varied and after gradation has been performed.

6. A method for color correction in the process for reproducing pictures, in which color separation picture signals obtained by photoelectrically scanning an original picture are converted into picture signals which correspond to four printing colored inks, including a black ink therein to produce respective reproduction pictures for plate making corresponding to each of the ink colors, comprising the steps of:

correcting the deficiency in reproduction density of the black ink to be used for a black print, in the case of the ratio of UCR being 100%, by any one of said other three colored inks;

obtaining turbid components, which are included in each of said colored inks, from two of said three colored inks excepting one of said three colors which corresponds to a signal for making said black print; and converting a part of a gray density of the black print into three color plate signals according to said part of said gray density corresponding to each of said color signals.

7. A method of color correction according to claim 6, wherein when said two colored ink signals, excepting said two colored ink signals for making said black print, are cyan (C), then turbid components of magenta (M) and yellow (Y) are obtained, and when said two colored ink signals are magenta (M), then only turbid components of yellow (Y) are obtained.

* * * * *